United States Patent [19]
Hunkeler

[11] 3,881,889
[45] May 6, 1975

[54] METHOD FOR RESHARPENING CUTTING BLADES AND CUTTER

[75] Inventor: Ernst J. Hunkeler, Fairport, N.Y.

[73] Assignee: The Gleason Works, Rochester, N.Y.

[22] Filed: Dec. 27, 1973

[21] Appl. No.: 428,989

[52] U.S. Cl. .................................. 51/288; 51/326
[51] Int. Cl. ............................................ B24b 3/36
[58] Field of Search .......... 51/285, 288, 326, 218 R, 51/218 A, 218 T, 225; 29/103 C, 95, 105 R, 105 A

[56] References Cited
UNITED STATES PATENTS

| | | | |
|---|---|---|---|
| 1,110,366 | 9/1914 | Wincrantz | 51/218 A |
| 1,162,304 | 11/1915 | Neuens | 51/92 HK X |
| 2,183,922 | 12/1939 | Robbins | 51/288 UX |
| 2,186,362 | 1/1940 | Candee | 51/288 |
| 2,186,417 | 1/1940 | Kraus | 29/105 |
| 2,218,786 | 10/1940 | Candee | 51/288 |
| 3,487,592 | 1/1970 | Kotthaus | 51/288 |
| 3,561,170 | 2/1971 | Dupuis | 51/288 |

*Primary Examiner*—Donald G. Kelly
*Attorney, Agent, or Firm*—Ralph E. Harper

[57] ABSTRACT

A method for resharpening cutting blades for gear cutting machines in such a way that a front face of each blade is preserved without removal of material therefrom. A cutter head assembly for gear cutting machines is described as including an arrangement of blade-receiving slots at angles to a longitudinal axis of the assembly so as to permit removal, resharpening, and replacement of blades into such slots without removing any stock from the cutting faces of the blades.

1 Claim, 12 Drawing Figures

METHOD FOR RESHARPENING CUTTING BLADES AND CUTTER

BACKGROUND AND BRIEF DESCRIPTION OF INVENTION

The present invention relates to improvements in methods for resharpening individual cutting blades designed for use in cutter head assemblies of gear cutting machines. The invention provides for faster and greatly simplified resharpening techniques which permit the use of economical blade designs in cutter head assemblies which are specifically designed and constructed to accommodate such economical blade designs.

It is known in the art of gear cutting machines to provide various designs of individual cutting blades to be fitted in a cutter head assembly so that the cutting blades can function to generate tooth profiles in a workpiece. Typically, the cutting blades used with such cutter head assemblies have been relatively complex in their design and costly to resharpen and replace because of the difficulty in maintaining critical angular relationships between front, end, and side faces of each cutting blade.

Numerous attempts have been made to reduce the initial and resharpening costs of cutting blades for various types of milling cutters. For example, it is known to place individual cutting blades in radially inclined slots in a cutter head assembly for the purpose of establishing a pre-set pressure angle for each blade without a requirement for a regrinding of the surface which establishes such an angle (see U.S. Pat. No. 3,673,655). Other types of milling tools have provided for an angular placement of cutting blades in a cutter head so as to establish rake and shear angles for a front face of the cutting blades (see U.S. Pat. No. 2,186,417). Also, it is known to provide for throw-away blades and blade tips, such as carbide tips, so as to eliminate the need for resharpening of a costly tool.

The present invention is specifically concerned with improvements in resharpening methods for individual cutting blades designed for use in gear cutting machinery capable of generating tooth profiles for spiral, bevel and hypoid gears. In applications of this type, dimensional relationships of the cutting tools are extremely critical and must be maintained to close tolerances in order to obtain a desired tooth profile for each tooth and slot of the final gear product. One of the relationships which must be carefully maintained is the angle and position of the cutting face (or chip face) of each cutting blade relative to the cutter head assembly in which it is carried and to the workpiece which is being cut. Although cutting blades of the type shown in U.S. Pat. No. 2,186,417 require no resharpening of their front faces, it is believed that all prior efforts in designing and resharpening cutting tools for gear cutting applications have required a careful resharpening of the cutting face each time the cutting tool is resharpened for further usage in a cutter head assembly (see, for example, U.S. Pat. No. 3,487,592). This requirement of past designs not only adds to the cost of use of a particular tool, but also prevents the usage of certain hard coatings on a steel substrate because such coatings would be removed during the resharpening process.

In contrast to prior art methods and means, the present invention provides for a greatly simplified and less costly resharpening of individual cutting blades in such a manner that all of the critical relationships required for gear cutting applications are maintained while a front face surface of each cutting blade is preserved during each resharpening. This not only eliminates the cost and difficulty of resharpening the critical front face parameter for each cutting blade tool but also permits the use of unusual material combinations or treatments, such as titanium carbide or chromium coatings with high speed steel substrates, for cutting tools having longer life and greater strength.

In accordance with the method of the present invention each cutting blade is resharpened by removing stock only from its end and side faces. No layers of stock are removed from the critical front face of the cutting blade, although it must be recognized that part of the front and back face surfaces are removed each time stock is removed from the side and end faces of the cutting blade. Thus, in the context of this specification and its claims, descriptions which say that no stock is removed from a front face of a cutting blade are intended to describe an avoidance of removal of layers of stock across the entire face of the cutting blade during a resharpening process.

The basic method of this invention involves the steps of removing stock from a first side face of the cutting blade so as to establish a pressure angle and side relief angle for the first side face. This action defines a cutting edge between the first side face and the front face of the cutting blade without removing a layer of stock from the front face to the cutting blade. A second step of the basic process involves a removing of stock from a second side face of the cutting blades so as to establish a clearance angle and a side relief angle on the second side face relative to the front face of the cutting blade. Again, this is done without removing a layer of stock from the front face of the cutting blade. The various angular relationships which will be identified in this specification and its claims, such as pressure, relief and clearance angles, will be defined with reference to drawings illustrating the intended angles and should not be confused with definitions which may have been used in this art with reference to different forms of cutting blades and the manner in which they are mounted in a cutter body.

These and other features and advantages of the present invention will become apparent in the more detailed discussion which follows. In that discussion reference will be made to the accompanying drawings as breifly described below.

DETAILED DESCRIPTION OF INVENTION

Figure 1:
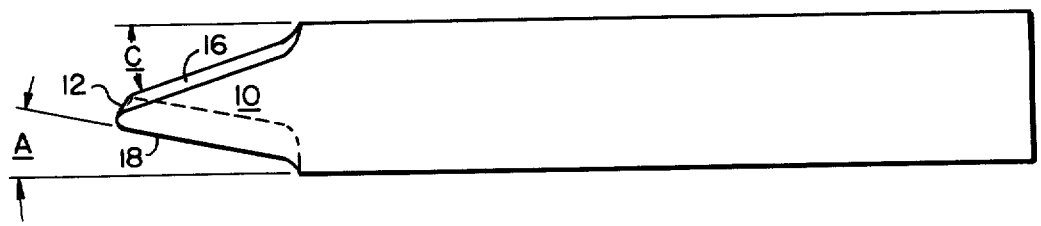
FIG. 1 is a face view of a single cutting blade of the type contemplated by the present invention.
Figure 2:
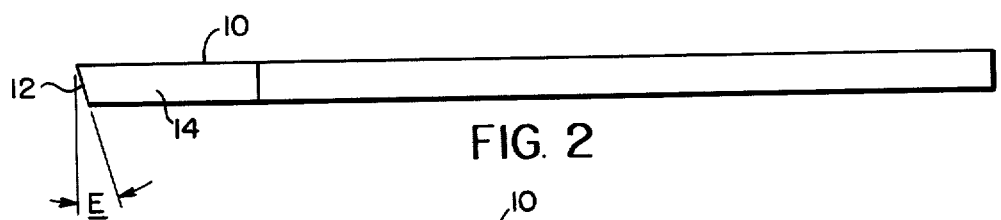
FIG. 2 is a side elevation of the cutting blade illustrated in FIG. 1.
Figure 3:
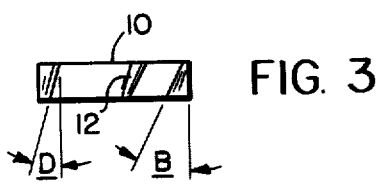
FIG. 3 is an end elevational view of the cutting blade illustrated in FIG. 1.

FIGS. 1-3 illustrate a type of cutting blade which can be formed and used in a cutting head assembly for gear cutting machines in accordance with the teachings of the present invention. The illustrated cutting blade is formed from relatively thin stock material, such as high speed steel, and its active cutting surfaces can be resharpened by a novel method which maintains critical angular relationships between a front face 10, an end face 12, a first side face 14, and a second side face 16 without removing a layer of stock from the front face 10. Thus, the illustrated cutting blade is of an unusual design for gear cutting applications because (a) it is much thinner than conventional cutting blades used in gear cutting machines, and (b) it can be resharpened without removing any material from its active cutting face 10 (also referred to as a chip face for such a cutting tool). By preserving the original condition of the front face 10, it is possible to treat the cutting face in some way to improve its hardness or other metallurgical characteristics. For example the front face 10 may be nitrided or coated (such as by vapor deposition) with any selected material which will improve the basic qualitites of the high speed steel material from which it may be made. For example, the front face 10 may be coated with titanium carbide or some other suitable coating material to improve the life or cutting characteristics of the cutting blade. It can be appreciated that a removal of material from the end face 12 and the two side faces 14 and 16 will necessarily remove some material from the front face 10 during each resharpening procedure, however, the portion of the front face 10 which remains after each resharpening will be preserved with whatever coating material or other treatment is applied thereto without removal of any layers of stock from that front face.

The method for resharpening the cutting blade illustrated in FIGS. 1-3 while maintaining critical angular relationships between front, end and side faces of the cutting blade, comprises a first step of removing stock from the first side face 14 so as to establish a pressure angle A (see FIG. 1) and a side relief angle B (see FIG. 3) for the side face 14 without removing a layer of stock from the front face 10. This removal of stock also defines a cutting edge 18 between the side face 14 and the front face 10 of the cutting blade.

A second step of the resharpening method involves the removal of stock from the second side face 16 of the cutting blade so as to establish a clearance angle C (see FIG. 1) and a side relief angle D (see FIG. 3) on the side face 16. Again, this step is carried out without removing a layer of stock from the front face 10 of the cutting blade.

The end face 12 is also sharpened by a step of stock removal so as to establish a top relief angle E (see FIG. 2) and a radius on the end face 12 of the cutting blade. Thus, the end face 12 and side faces 14 and 16 are resharpened to maintain all critical angular relationships for the cutting blade without removal of stock from the surface of the cutting face 10 of the illustrated blade. The blade may be resharpened for as many times as there is sufficient material in its main body portion, and after each resharpening, the blade can be reinserted into a cutter head assembly and adjusted axially to a preferred position for making contact with a workpiece.

There is no requirement for resharpening the back face of each blade, as is known from prior sharpening techniques.

Figure 4:
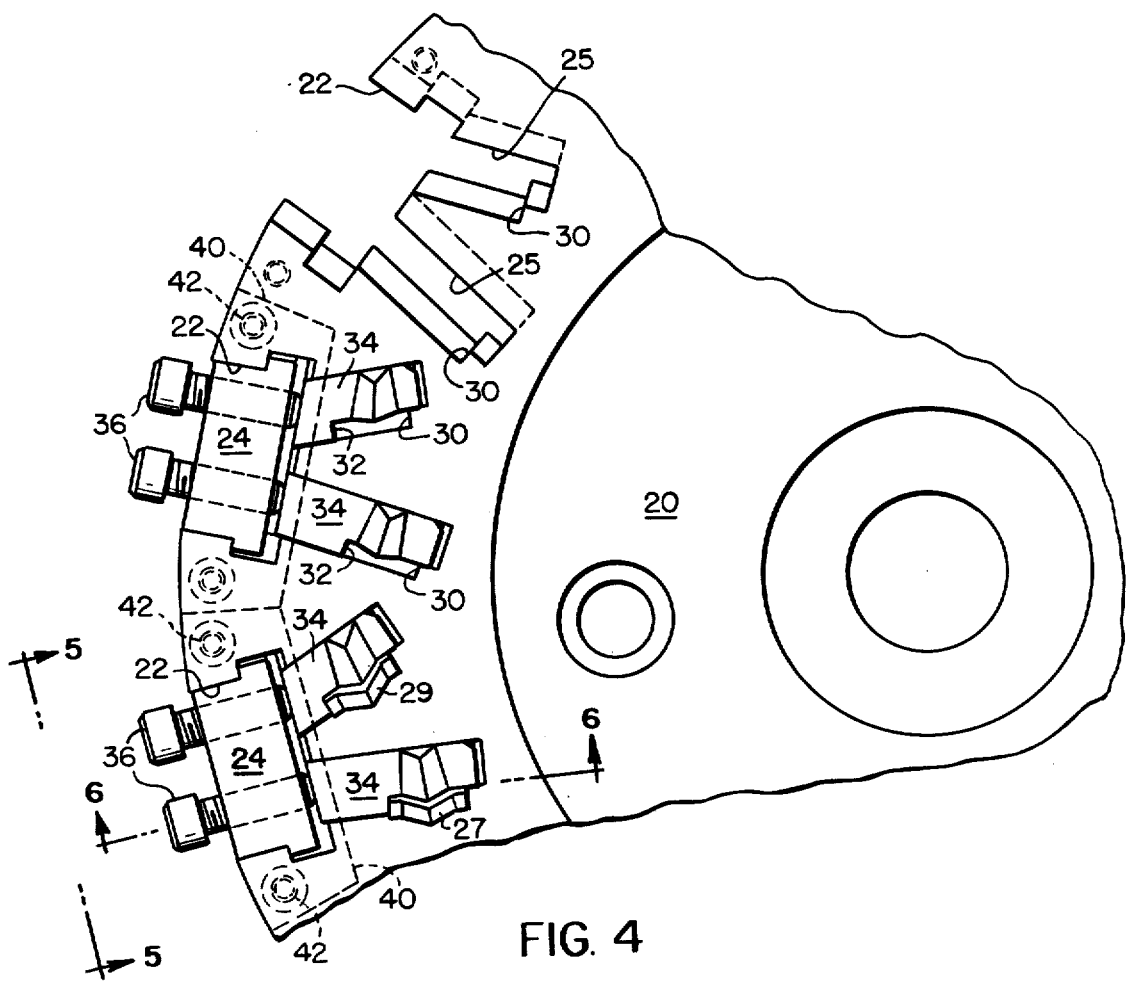
FIG. 4 is a front elevational view, partly in section, of a portion of a cutter head assembly designed to carry cutting blades of the type illustrated in FIGS. 1-3.
Figure 5:
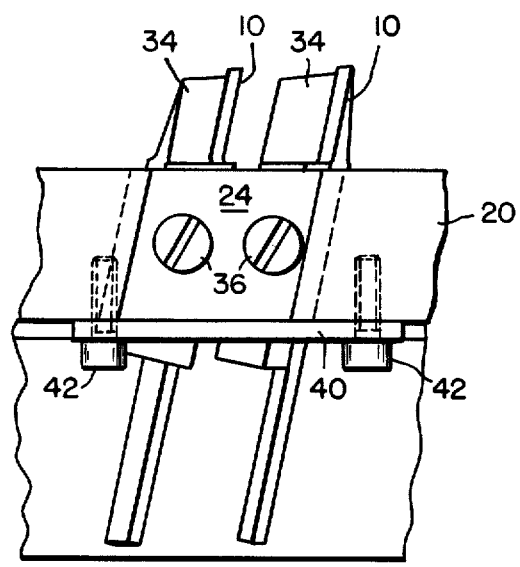
FIG. 5 is a side elevational view of a portion of the cutter head body illustrated in FIG. 4.
Figure 6:
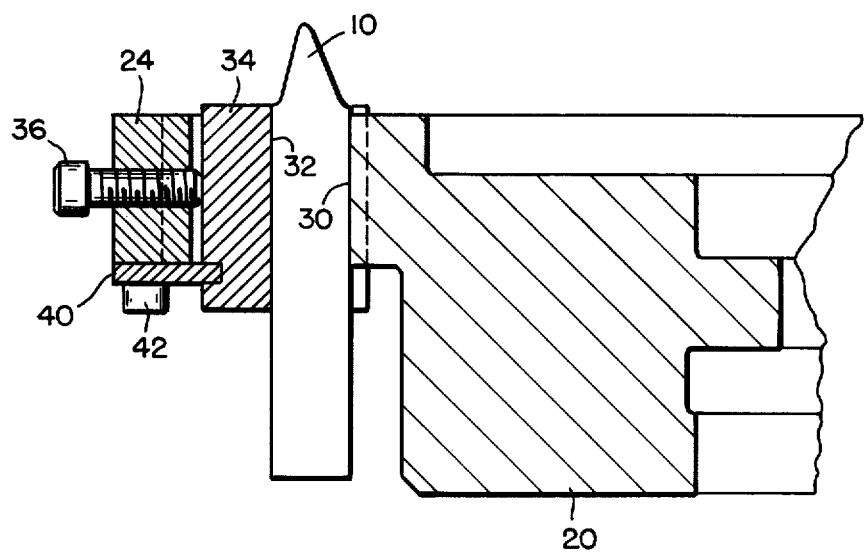
FIG. 6 is an elevational view, in radial section along line 6—6 of FIG. 4.

FIGS. 4-6 illustrate portions of a cutter head assembly which is specifically designed to carry the type of relatively thin cutting blade illustrated in FIGS. 1-3. FIG. 4 illustrates a front elevational view of a segment of a cutter head assembly having a disc-shaped cutter head body 20. The cutter head body is formed in a known fashion to include means for being mounted on a spindle of a gear cutting machine. The cutter head body includes a plurality of clamping slots 22 formed into its periphery for receiving clamping members 24. Only three clamping slots 22 are illustrated in the FIG. 4 view, and it can be seen that each clamping slot is identical in form and equally spaced from next adjacent slots about the periphery of the cutter head body. Two clamping members 24 are shown in position in the FIG. 4 illustration, and the third clamping slot is shown without any clamping member or cutting blades in place. Each clamping slot 22 includes two or more blade-receiving slots 25 formed in communication therewith so that a single clamping member 24 can function to secure two or more cutting blades in each position. In the illustrated embodiment each clamping slot 22 is provided with only two communicating blade-receiving slots so that an inside blade 27 and an outside blade 29 can be received at each clamping slot position. Other arrangements may provide for three blade-receiving slots so that inside, outside, and bottoming blades can be provided at each clamping slot position.

Individual cutting blades are received into the blade-receiving slots 25 so that one side face of the main body of each blade is abutted against an end wall 30 formed in each blade-receiving slot. An opposite side face of the main body of each cutting blade is engaged by a ledge portion 32 of a supporting block 34 inserted into each blade-receiving slot 24. When the supporting blocks 34 are inserted into their respective blade-receiving slots 25 so as to engage an individual cutting blade therein, the clamping force applied to each supporting block functions to apply sufficient friction to the opposite side edges of the cutting blade body so as to retain the cutting blade in its set position within the cutter head assembly. It can be appreciated that clamping forces are applied to the individual supporting blocks by separate screw members 36 which are threaded through the clamping members 24 so as to contact and engage exposed ends of each supporting block 34. As shown in the lowermost positions in the FIG. 4 illustration, and in FIG. 5, the supporting blocks 34 are shaped and dimensioned to nearly correspond to the overall profile of the cutting ends of each cutting blade. This provides full support for each cutting blade during its engagement with a workpiece and allows for a nominal amount of wear of the cutting edge of the blade during its use. The main body portion of each cutting blade is preferable formed with parallel surfaces formed at right angles to each other.

As shown in FIGS. 5 and 6, the cutter head assembly may be provided with plate structures 40 secured to a rear face of the cutter head body by fastening elements 42 so as to prevent the clamping members 24 and the supporting blocks 34 from falling downwardly (in the attitude of FIG. 6) when the clamping screws 36 are loosened to remove and replace individual cutting blade elements.

FIG. 5 illustrates a characteristic inclination of the blade-receiving slots of the cutter head assembly so as to define and set an angular relationship of each front face 10 of each blade relative to a longitudinal axis of the cutter head assembly and to the workpiece which will be contacted by the cutting blades. Each time a cutting blade is removed and resharpened, it can be re-inserted into the cutter head assembly, and the angular relationship of its front face 10 will be automatically re-established by the angle of inclination of the blade-receiving slot into which the blade is inserted. Thus, cutting blades can be removed, resharpened, and replaced into their respective slots without removing any stock from their cutting faces.

FIGS. 7–12 illustrate details of a resharpening device designed for resharpening the type of cutting blade illustrated in FIGS. 1–3 in accordance with the method of the present invention. The illustrated device is adapted to utilize automatic loading and unloading devices (not illustrated) so that individual blades can be automatically placed into and removed from prescribed positions within the device for a complete resharpening of end and side faces in accordance with the method discussed above. The illustrated device is capable of resharpening individual cutting blades very accurately and a very rapid rate.

Figure 7:
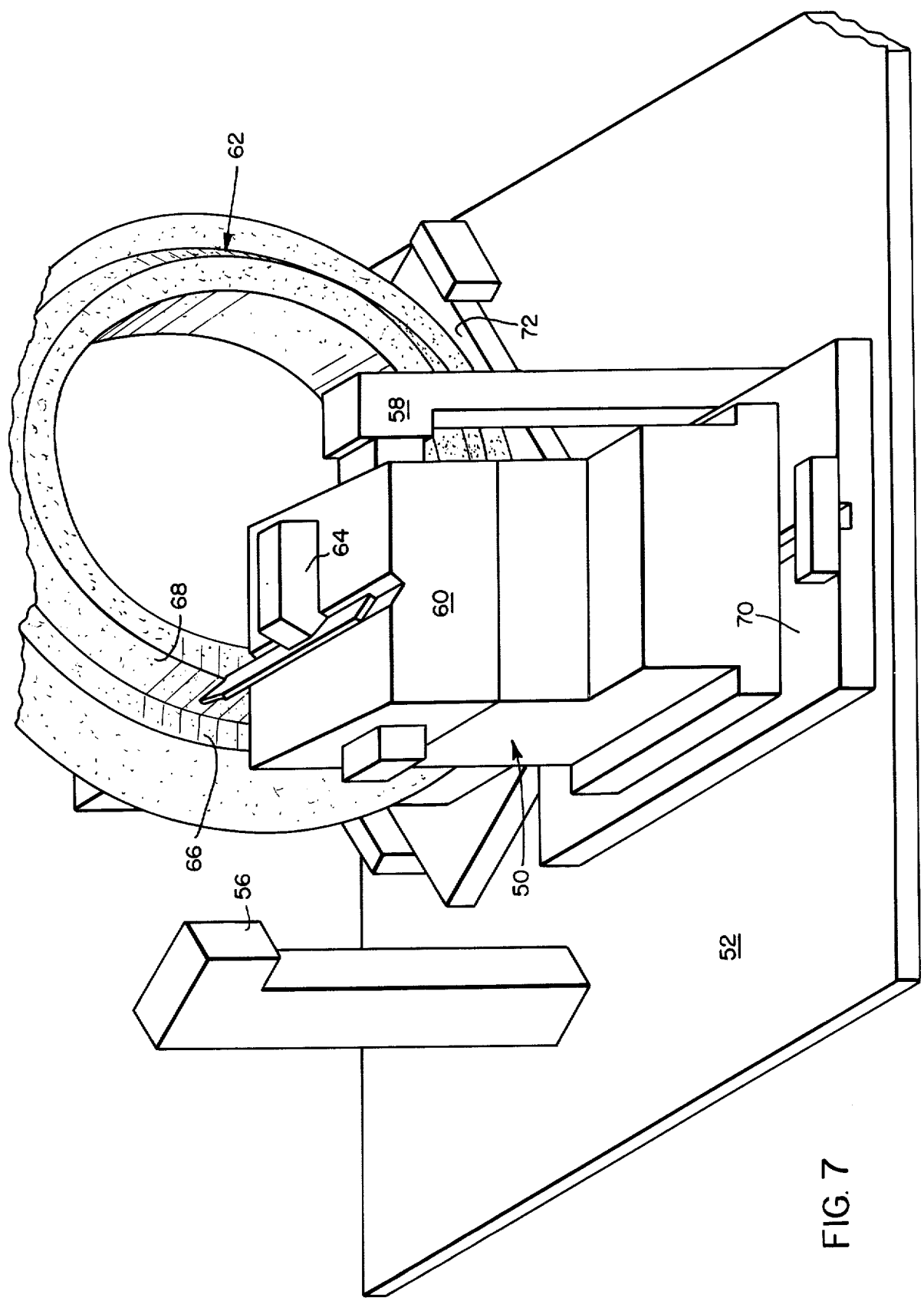
FIG. 7 is an isometric view illustrating general relationships in a device for resharpening cutter blades in accordance with the method of the present invention.

FIG. 7 illustrates basic assemblies making up the resharpening device of the present invention, and these assemblies are illustrated in simplified form for ease of understanding.

A holding fixture 50 is mounted on a base 52 so that it can be moved about a vertical pivot axis 54 (see FIG. 10) between two limit positions defined by stops 56 and 58. The holding fixture includes a mounting block 60, which will be discussed in greater detail with reference to FIG. 12, for holding a single cutting blade in precise relationship to an abrading surface. The abrading surface may be in the form of cup-shaped grinding wheel 62, of known composition, which is mounted on the base 52 for translational movements between two limit positions.

The holding fixture functions to receive and clamp (with clamping means 64) a cutting blade in a position which establishes, when the cutting blade is brought into contact with the grinding wheel 62, (a) a relief angle on a pressure angle side of the cutting blade, (b) a relief angle on a clearance angle side of the cutting blade, (c) a top relief angle for an end of the cutting blade, (d) a radius for the end of the cutting blade, (e) a point width for the end of the cutting blade, and (f) a length for the cutting edge of the blade. All of these parameters are automatically sharpened onto end and side faces of each cutting blade by two separate contacts of the cutting blade with two separate grinding surfaces provided on the grinding wheel 62. A first grinding surface 66 is shaped to remove stock from a first side face 14 (see FIGS. 1–3) of a cutting blade so as to establish the pressure angle A and the side relief angle B for that side of the cutting blade. In addition, the first grinding surface 66 functions to remove stock from the end face 12 of the cutting blade so as to establish the top relief angle E and a radius and width for the end face of the cutting blade. A second grinding surface 68 projects outwardly at an angle from the first grinding surface 66 and functions to remove stock from the second side face 16 (see FIGS. 1 and 3) of the cutting blade so as to establish the clearance angle C and the side relief D of the cutting blade. As will be discussed with reference to FIG. 12, the position and attitude of the cutting blade in the mounting block 60 is critical to an establishment of precise angular relationships when the cutting blade is brought into engagement with the two grinding surfaces 66 and 68 of the grinding wheel 62.

Figure 8:
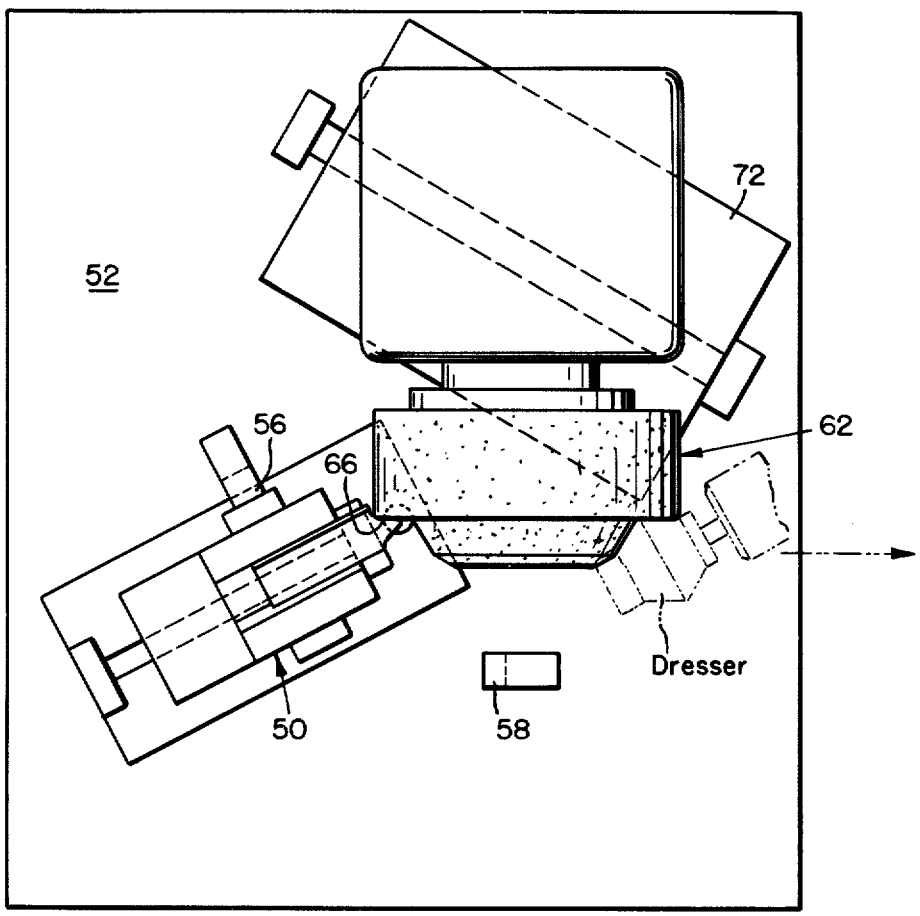
FIG. 8 is a top plan view, in reduced scale, of the device illustrated in FIG. 7 and showing a first position for a holding fixture for sharpening a first side of a cutting blade held by the holding fixture.

FIGS. 8–11 illustrate the steps involved in grinding and sharpening the side and end faces of an individual cutting blade with the resharpening device of this invention. FIG. 8 illustrates a first step wherein the holding fixture 50 is in a first limit position against the stop means 56 for presenting the first side face 14 of a cutting blade to the first grinding surface 66 of the grinding wheel 62. Prior to movement to the grinding position, the cutting blade is secured into the mounting block 60 with the clamping device 64 (shown in FIG. 7 but omitted from FIGS. 8–11 for clarity). The holding fixture 50 is mounted on a slide 70 so that the cutting blade can be fed into engagement with the first grinding surface 66 when set in the position shown in FIG. 8. Infeed of the holding fixture can be provided manually or automatically with a worm drive mechanism, or its equivalent, as is known in this art.

Figure 9:
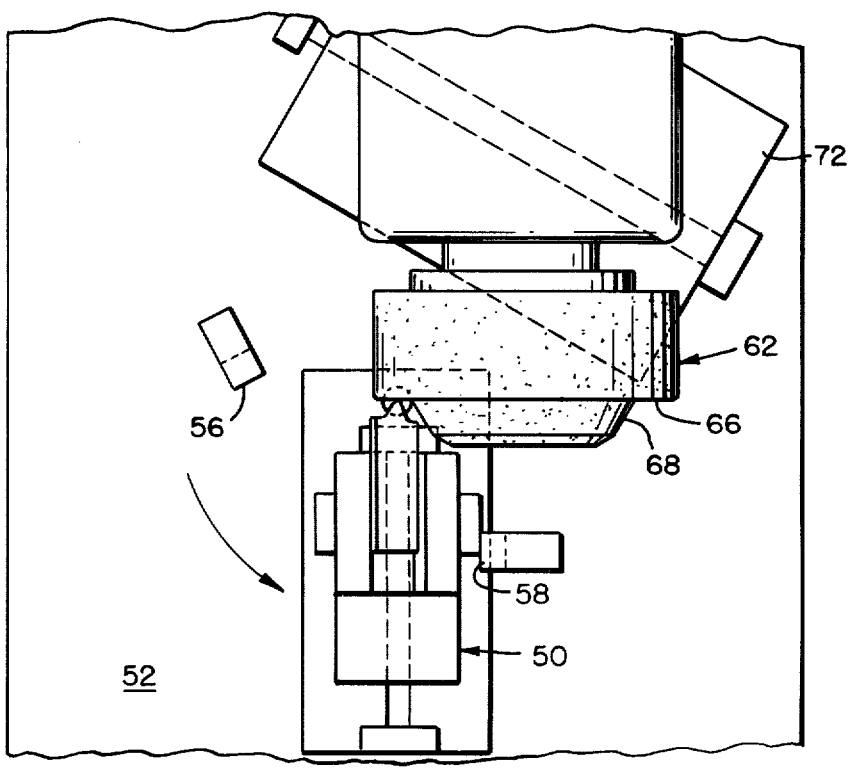
FIG. 9 is a view similar to that shown in FIG. 8, illustrating movement to a second position of the holding fixture for sharpening and end surface of a cutting blade.

Once the first side face 14 has been resharpened in the position shown in FIG. 8, the entire holding fixture is swung about its pivot axis 54 relative to the base 52 and the grinding wheel 62. FIG. 9 illustrates the swinging motion which is provided, and the holding fixture is moved all the way to a second limit position defined by the stop 58, as shown in FIG. 9. This pivotal movement of the holding fixture 52 may be provided automatically by a drive mechanism which is not shown in the simplified drawings of FIG. 7–11. During the pivotal motion, stock is removed from the end face 12 of the cutting blade so as to establish a top relief angle E, a radius, and a point width for the cutting blade. This action also determines the length of the cutting edge defined on the cutting blade. This stock removal takes place on the same grinding surface 66 as is used for resharpening the first side face 14 of the cutting blade.

Figure 10:
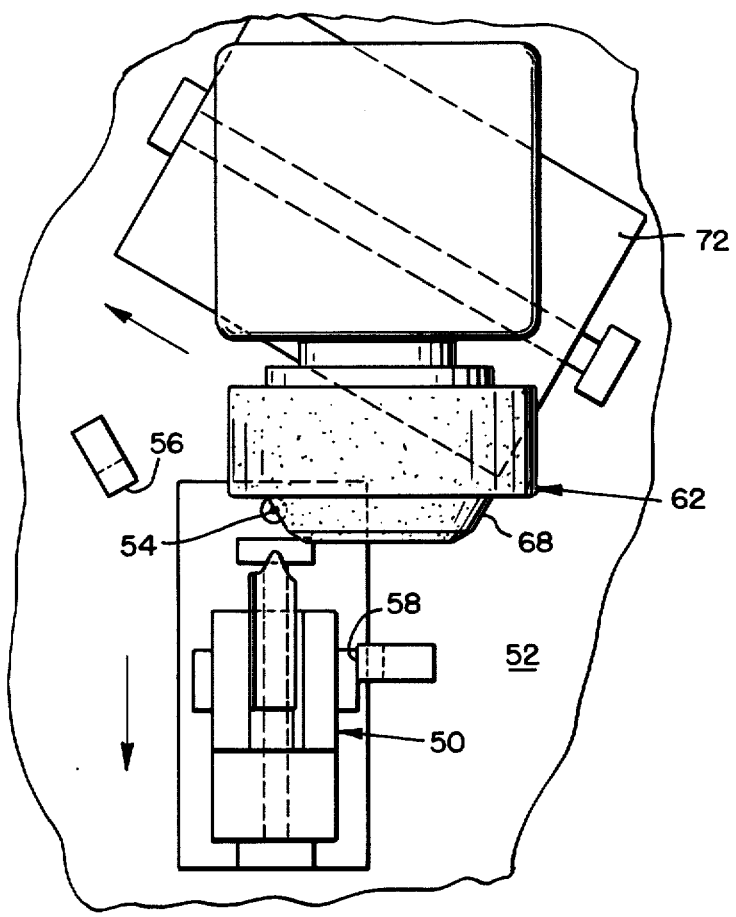
FIG. 10 is a view similar to that of FIG. 9, showing the holding fixture withdrawn and movement of the grinding wheel to a new position for grinding a second side of a cutting blade.

Upon completion of resharpening of the end face of the cutting blade, the holding fixture 50 is withdrawn on its slide 70 so as to remove the cutting blade from contact with the grinding wheel 62. While the cutting blade is being withdrawn from contact with the grinding wheel, the position of the grinding wheel 62 is adjusted by a translational movement of a grinding wheel slide 72 in a direction which brings the second grinding surface 68 in alignment with the second side face 16 of the cutting blade. Movement of the grinding wheel 62 on its slide 72 is accomplished with known driving mechanisms which are not illustrated. FIG. 10 illustrates, with arrows, the directions of movement for the holding fixture 50 and for the grinding wheel 62 during this step of the process.

Figure 11:
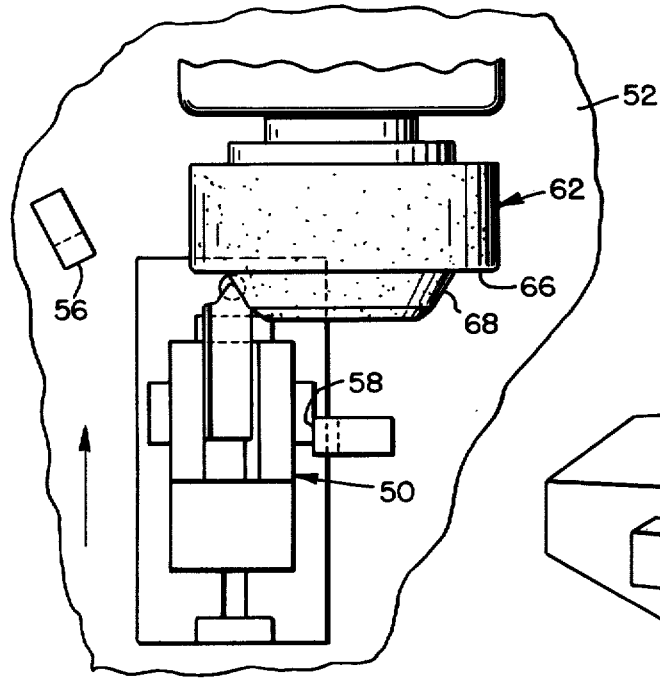
FIG. 11 is a view similar to FIGS. 9 and 10, showing engagement between a cutting blade and the grinding wheel in a position which grinds a second surface of the cutting blade.

FIG. 11 illustrates a final step of the process wherein the holding fixture 50 is advanced on its slide 70 (in the direction of the arrow) to bring the second side face of the cutting blade into contact with the second grinding surface 68 of the grinding wheel 62. The grinding surface 68 is shaped to remove stock from the second side face of the cutting blade so as to establish the clearance angle C and a side relief angle D on the second side face of the cutting blade. It is important to place the second side face of the cutting blade at a precise position above or below a horizontal plane drawn through the center of the grinding wheel 62 (as determined by the thickness and angular profiles of the mounting block 60). This permits grinding of different angular profiles on opposite sides of a cutting blade without removing and refitting the cutting blade into the same or a different grinding fixture. After this operation is completed, the holding fixture 50 can be withdrawn from the position shown in FIG. 11, the cutting blade can be removed, and the holding fixture can be rotated back to the limit position defined by stop 56 so as to receive another cutting blade for resharpening. Of course, the grinding wheel 62 is also withdrawn to its initial position for receiving another cutting blade against its first grinding surface 66 while the holding fixture is in the limit position defined by the stop 56.

All of the motions of the resharpening device can be carried out automatically and very rapidly with known mechanisms. Movement of the holding fixture and of the grinding wheel can be easily timed and programmed so that very rapid sharpening of the separate side and end faces of the cutting blade can be accomplished. A typical resharpening operation takes approximately thirty to forty seconds with the type of fixture which has been illustrated and discussed. The grinding wheel is periodically dressed with a known form type of dressing wheel which can be brought into contact with the grinding surfaces 66 and 68.

Figure 12:
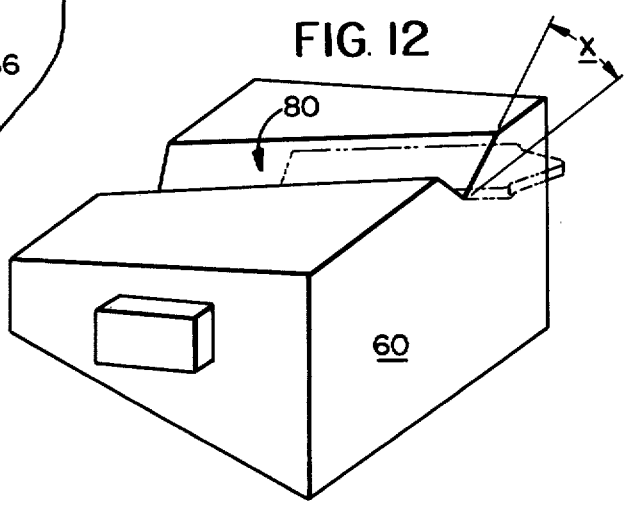
FIG. 12 is an isometric view of a mounting block used with the holding fixture of the device of FIG. 7.

FIG. 12 illustrates details of construction of the mounting block 60 which is carried by the holding fixture 50. The mounting block 60 may be a permanent part of the holding fixture, but preferably it constitutes a removable assembly which can be replaced with another mounting block having different parameters designed into its blade-positioning groove 80. Each mounting block is designed to set certain angular relationships which are critical to the type of grinding action which will take place when a cutting blade is secured into the mounting block and advanced into contact with the grinding surfaces of the grinding wheel 62. For example, the angle of longitudinal inclination of the blade-receiving groove 80 determines the top relief angle E which will be ground into an end face of the cutting blade as the cutting blade is rotated on the first grinding surface 66 of a grinding wheel. The angle of inclination X of the cutting blade within the blade-receiving groove 80 establishes the relief angle B for the first side face 14 of the cutting blade. This angle also determines the clearance relief angle C when the cutting blade is swung to a new position to contact a second grinding surface 68 of a grinding wheel 62. Different types of cutting blades, such as inside, outside, and bottoming blades, used in gear cutting machinery will require different angular relationships, and therefore, a typical use of the resharpening device will provide for a sharpening of like blades in relatively large batches, followed by a changing of the mounting block 60 to provide for a sharpening of a batch of different blades with the same grinding wheel profiles. The use of the mounting block 60 will permit accurate repeatability for any given design of cutting blade.

The following examples represent typical roughing cutting blades, for gear cutting machinery, which can be manufactured and resharpened in accordance with the present invention:

Cutting blades formed from high speed steel (type M2) stock material having a thickness selected from the range of 0.100-0.120 inch, an overall length of about 3.25 inches, and a width of about 0.532 inch were manufactured and resharpened in accordance with the method of the present invention to establish the following relationships (as shown in FIGS. 1–3):

|                      | Outside Blade 29 | Inside Blade 27 |
|----------------------|------------------|-----------------|
| Pressure Angle A =   | 19° – 28½°       | 10° – 21° 15'   |
| Side Relief Angle B =| 4° – 8°          | 4° – 8°         |
| Clearance Angle C =  | 4° – 15°         | 13° – 22°       |
| Side Relief Angle D =| 4° – 8°          | 4° – 8°         |
| Top Relief Angle E = | 6° – 8°          | 6° – 8°         |

Blades manufactured in accordance with the above are suitable for insertion into "7½ inch" and "9 inch" roughing cutter heads. The angle of inclination of the front surfaces of the blades to a longitudinal axis of the cutter (as determined by the angle of inclination of the slots 25 in the cutter head) is set at about 12° to establish a positive hook angle for each cutting blade. The rake angles for the cutting blades (as determined by the angular offset of each slot 25 from a radius of the cutter head) in the cutter head can be in the range of 20° to 30°.

Although the invention has been described with reference to a single cutting blade and a single embodiment of a resharpening device for carrying out the described method, it will be appreciated that other designs of cutting blades and resharpening fixtures may be used for accomplishing the same purposes.

What is claimed is:

1. A method for resharpening a cutting blade having (a) a front face 10, (b) an end face 12, (c) a first side face 14, and (d) a second side face 16, without removing a layer of stock from said front face 10, said method being characterized by the steps of moving said cutting blade relative to said abrading surface to remove stock from said end face 12 to form an end radius and a top relief angle E on the end face of the cutting blade, relatively advancing said first side face 14 of the cutting blade into contact with an abrading surface so as to remove stock to form a pressure angle A and a side relief angle B on said first side face 14 of the cutting blade, this step also serving to define a cutting edge 18 between the first side face 14 and said front face 10 of the cutting blade, and relatively advancing said second side face 16 into contact with an abrading surface so as to remove stock to form a clearance angle C and a side relief angle D on said second side face 16, whereby critical angular relationships between front, end, and side faces of the cutting blade are maintained without removing a layer of stock from the front face.

* * * * *